UNITED STATES PATENT OFFICE.

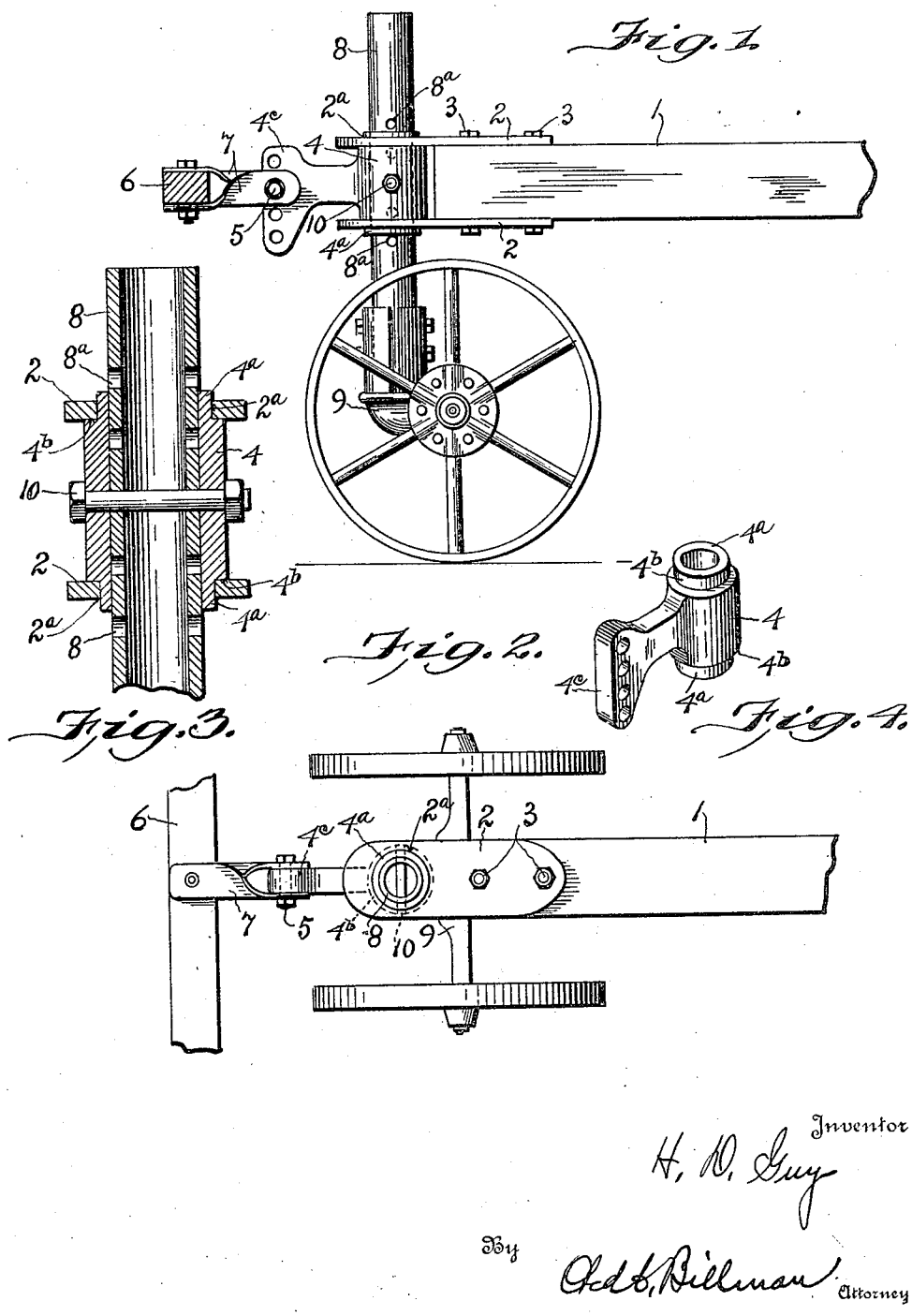

HIRAM D. GUY, OF BEREA, OHIO, ASSIGNOR TO THE DUNHAM COMPANY, OF BEREA, OHIO, A CORPORATION OF OHIO.

DRAFT APPLIANCE.

1,402,415.  Specification of Letters Patent.  Patented Jan. 3, 1922.

Application filed April 22, 1920. Serial No. 375,699.

*To all whom it may concern:*

Be it known that I, HIRAM D. GUY, a citizen of the United States, residing at Berea, in the county of Cuyahoga and State of Ohio, have invented certain new and useful Improvements in Draft Appliances, of which the following is a specification.

My invention relates to improvements in draft appliances, and more particularly to that class or type which are designed and adapted for use in connection with the draft bar or tongue of an agricultural implement in adapting the same to be drawn either by draft animals or by a tractor and where it is desirable to vary or adjust the height of the draft bar or stub pole, to meet the varying demands of actual service.

The improved draft appliance is particularly designed to be used interchangeably in effecting a coupling or connection with suitable draft animals where a fore truck is desirable, or in connecting or coupling to a tractor where such fore or tongue truck is preferably dispensed with.

The primary object of the invention is to provide a generally improved draft appliance of the character indicated which will be exceedingly simple in construction, cheap of manufacture, and efficient in use.

A further and very important object of the invention is the provision of an improved draft sleeve or head to be used interchangeably with either draft animals or a tractor together with improved means for mounting and connecting such a draft head or sleeve to the implement draft bar, and when desired, attaching the same to a suitable truck bearing column and improved means for removably and adjustably mounting the latter independently of said draft sleeve head and its mounting.

With the above mentioned and other ends in view, the invention consists in the novel construction, arrangement, and combination of parts, hereinafter described, illustrated in one of its embodiments in the accompanying drawings, and particularly pointed out in the appended claim.

Referring to the drawings, forming a part of this specification, Figure 1, is a side elevation of a fore truck and draft bar of an implement equipped with a draft appliance constructed in accordance with my invention.

Figure 2, a top plan view of the same.

Figure 3, an enlarged central vertical sectional view of the draft sleeve head mounting, and truck column or swivel post and illustrating in particular the improvements for removably and adjustably mounting the truck post or column bearing independently of said draft sleeve head and its mounting.

Fig. 4, a perspective view of the improved draft or sleeve head detached.

Similar numerals of reference designate like parts throughout all the figures of the drawings.

The draft bar 1, may be of any suitable and convenient form, and at the present instance, is in the specific form of a stub pole frequently used in connection with various forms of agricultural implements. The draft bar or stub pole 1, is provided at its front with vertically spaced bearing plates 2 connected by means of suitable attaching bolts 3, at the rear and projecting forwardly and provided with suitable bearing openings $2^a$.

A draft bearing head 4, in the specific form of a bearing sleeve head is interposed between the bearing plates 2, and is provided with reduced bearings $4^a$ adapted to fit within the openings $2^a$ of the plates and affording an annular shoulder $4^b$ to rest against the adjacent sides of the bearing plates and hold the draft head in proper relative position for use when the parts mentioned have been assembled.

The bearing sleeve head 4 is preferably provided with a clevis $4^c$ provided with a series of openings to receive and contain a suitable connecting bolt 5, or other suitable connecting device for attaching to suitable connections for draft animals or a tractor, such for example as the double tree 6 (or in lieu thereof the draft bar of the tractor), said draft bar being connected in the present instance to the connecting bolt 5 by means of connecting straps 7.

As a means of connecting the draft or bearing sleeve head 4 to the bearing column or post 8 of a suitable truck 9, the sleeve head 4 is provided with a suitable transverse bolt or fastening element 10 for removably and adjustably receiving the column or post 8 of the truck. The truck column or post 8 is preferably provided with a series of transverse openings $8^a$ through which the fastening element 10 may be passed in securing suitable adjustment for varying the height of the draw bar 1 as the occasion may demand and the truck body 9 may be of any suitable and convenient form and provided with ground wheels of either the single wheel or double wheel type. While I have shown a truck of the two-wheel type it is understood that the term "truck" includes a truck of any suitable type and of any suitable number of ground wheels.

It will be seen that the vertically spaced bearing plates 2 afford ready access to the attaching element or bolt 10 in inserting and removing the bearing column of the truck, and also will permit the free turning of the forwardly extending draft member or clevis 4$^c$ incident to the turning of the implement in actual service. It will also be seen that when the truck column or post bar is connected, the same together with the ground wheels will be turned in accordance with the turning movements of the bearing head 4 through the draft member 4$^c$, and that when it is desired to attach the draft attachment to the draw bar of a tractor the fore or tongue truck may be readily removed by removing the bearing post 8 after the removal of the attaching or bolt member 10.

Having thus described one of the embodiments of my invention, without having attempted to set forth all the forms in which it may be made or all the modes of its use, what I claim and desire to secure by Letters Patent is,—

A draft appliance, comprising a stub pole provided at its front with vertically spaced removably mounted bearing plates having openings, a bearing sleeve head interposed between said plates and provided with reduced bearing members fitting said openings, said sleeve head being provided at its front with a clevis movable laterally relatively of said bearing plates, and means for adjustably and removably securing a swivel truck post in said bearing sleeve head independently of the mountings of the latter.

In testimony whereof I have affixed my signature.

HIRAM D. GUY.